United States Patent
Bai et al.

(10) Patent No.: US 8,665,986 B2
(45) Date of Patent: Mar. 4, 2014

(54) COMMUNICATION SYSTEM WITH MODULATION CLASSIFIER AND METHOD OF OPERATION THEREOF

(75) Inventors: Dongwoon Bai, San Diego, CA (US); Jungwon Lee, San Diego, CA (US); Sungsoo Kim, San Diego (CA); Junghyun Bae, San Diego, CA (US); Jooyeol Yang, Suwon-si (KR); Inyup Kang, San Diego, CA (US)

(73) Assignee: Samsung Electronics Co., Ltd., Gyeonggi-Do (KR)

( * ) Notice: Subject to any disclaimer, the term of this patent is extended or adjusted under 35 U.S.C. 154(b) by 0 days.

(21) Appl. No.: 13/435,309

(22) Filed: Mar. 30, 2012

(65) Prior Publication Data

US 2013/0058427 A1    Mar. 7, 2013

Related U.S. Application Data

(60) Provisional application No. 61/531,607, filed on Sep. 6, 2011.

(51) Int. Cl.
*H04B 15/00* (2006.01)

(52) U.S. Cl.
USPC .............. 375/285; 375/262; 375/341

(58) Field of Classification Search
None
See application file for complete search history.

(56) References Cited

U.S. PATENT DOCUMENTS

| 6,452,964 | B1 | 9/2002 | Yoshida |
| 7,379,507 | B2 | 5/2008 | Chen et al. |
| 7,697,639 | B2 | 4/2010 | Kim et al. |
| 2006/0227885 | A1* | 10/2006 | Thesling ................ 375/259 |
| 2009/0022251 | A1* | 1/2009 | Ko et al. ................ 375/341 |
| 2010/0260281 | A1 | 10/2010 | Xie et al. |

FOREIGN PATENT DOCUMENTS

WO    2007056755 A2    5/2007

OTHER PUBLICATIONS

Choqueuse et al, "Blind Modulation Recognition for MIMO Systems", "Military Academy Technical Academy Review", Jun. 2009, pp. 183-196, vol. 19, No. 2.
Choqueuse et al, "Modulation Recognition for MIMO Communications", 2008, pp. 4 pgs, Publisher: IEEE Comm'08, Published in: Bucarest, Romania.
Bai et al., "Near ML Modulation Classification", 2012, pp. 5 pgs, Publisher: IEEE ICC, Published in: San Diego, USA.
Hassan et al., "Blind Modulation Identification for MIMO Systems", "Globecom 2010 proceeding", 2010, pp. 5 pgs, Publisher: IEEE.
Wei et al., "A New Maximum-Likelihood Method for Modulation Classification", "Conference Record of the Twenty-Ninth Asilomar Conference on Signals, Systems and Computers", Oct.-Nov. 1995, pp. 1132-1136, vol. 2, Publisher: IEEE.
International Search Report for PCT Application No. PCT/KR2012/007189, mailed Feb. 25, 2013.

* cited by examiner

*Primary Examiner* — Adolf Dsouza
(74) *Attorney, Agent, or Firm* — IP Investment Law Group

(57) ABSTRACT

A method of operation of a communication system includes: calculating a shift distance of a received signal having a distortion; calculating an approximate likelihood of the received signal matching a transmitted signal from the shift distance; determining a bias factor from the distortion; and selecting a determined modulation maximizing a combination of the approximate likelihood and the bias factor for communicating with a device.

18 Claims, 5 Drawing Sheets

COMMUNICATION SYSTEM WITH MODULATION CLASSIFIER AND METHOD OF OPERATION THEREOF

CROSS-REFERENCE TO RELATED APPLICATION(S)

This application claims the benefit of U.S. Provisional Patent Application Ser. No. 61/531,607 filed Sep. 6, 2011, and the subject matter thereof is incorporated herein by reference thereto.

TECHNICAL FIELD

The present invention relates generally to a communication system, and more particularly to a system for classifying the modulation.

BACKGROUND ART

Modern portable consumer and industrial electronics, such as navigation systems, cellular phones, portable digital assistants, and combination devices, are providing increasing levels of functionality to support modern life including mobile communication. As users become more empowered with the growth of mobile communication technology, new and old paradigms begin to take advantage of this new device space.

The ever increasing need for information in modern life requires users to have access to information at all times, at increasing data rates. However, signals used in mobile communication effectively experience various types of interference from numerous sources, which affect the quality and speed of the accessible data.

Thus, a need still remains for a communication system with modulation classifier. In view of the increasing consumer needs, it is increasingly critical that answers be found to these problems. In view of the ever-increasing commercial competitive pressures, along with growing consumer expectations and the diminishing opportunities for meaningful product differentiation in the marketplace, it is critical that answers be found for these problems. Additionally, the need to reduce costs, improve efficiencies and performance, and meet competitive pressures adds an even greater urgency to the critical necessity for finding answers to these problems.

Solutions to these problems have been long sought but prior developments have not taught or suggested any solutions and, thus, solutions to these problems have long eluded those skilled in the art.

DISCLOSURE OF THE INVENTION

The present invention provides a method of operation of a communication system including: calculating a shift distance of a received signal having a distortion; calculating an approximate likelihood of the received signal matching a transmitted signal from the shift distance; determining a bias factor from the distortion; and selecting a determined modulation maximizing a combination of the approximate likelihood and the bias factor for communicating with a device.

The present invention provides a communication system, including: a distance module for calculating a shift distance of a received signal having a distortion; a likelihood approximation module, coupled to the distance module, for calculating an approximate likelihood of the received signal matching a transmitted signal from the shift distance; a bias module, coupled to the likelihood approximation module, for determining a bias factor from the distortion; and a selection module, coupled to the bias module, for selecting a determined modulation maximizing a combination of the approximate likelihood and the bias factor for communicating with a device.

Certain embodiments of the invention have other steps or elements in addition to or in place of those mentioned above. The steps or elements will become apparent to those skilled in the art from a reading of the following detailed description when taken with reference to the accompanying drawings.

BEST MODE FOR CARRYING OUT THE INVENTION

Figure 1:
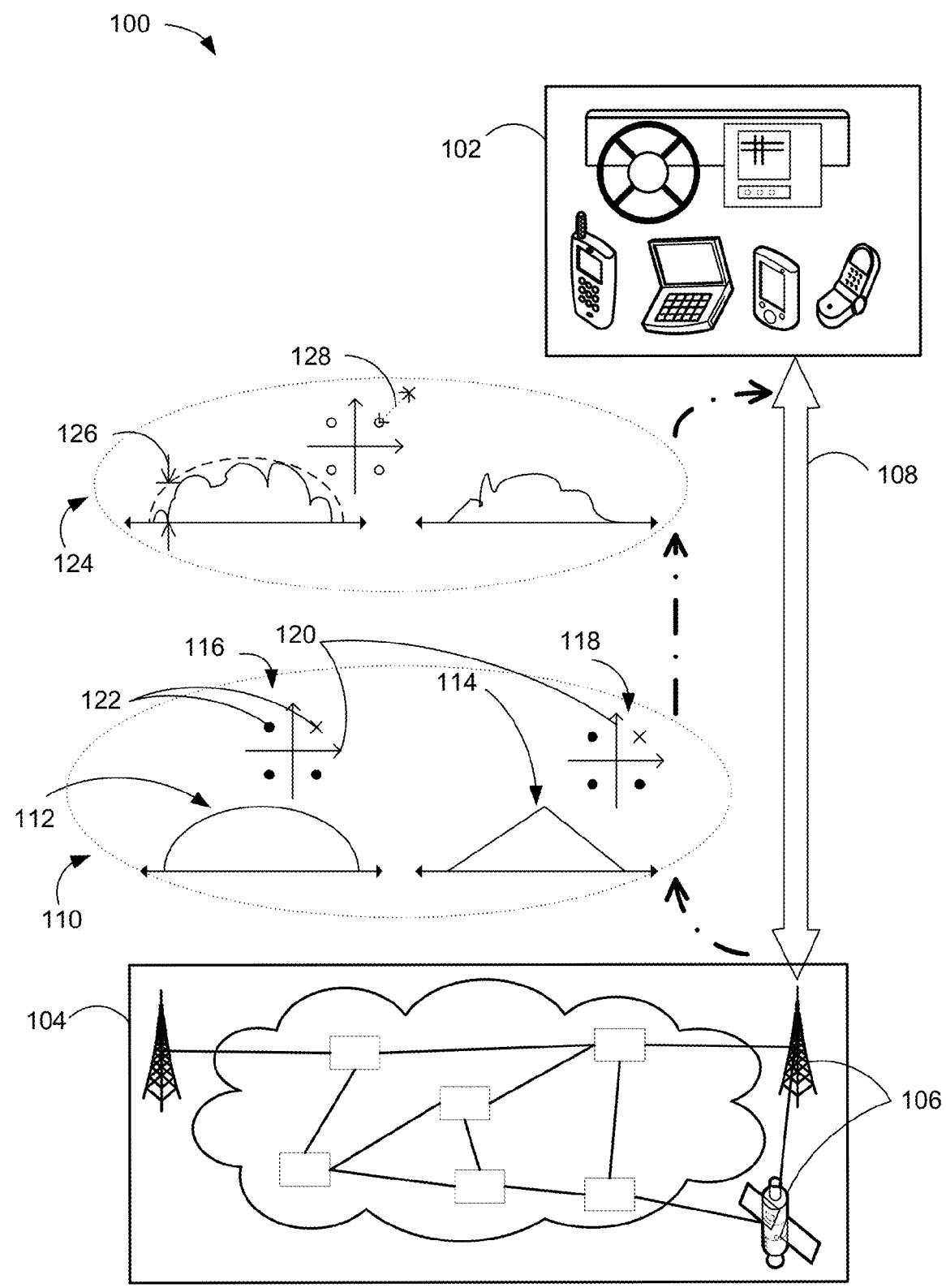
FIG. 1 is a communication system with near maximum-likelihood modulation classifier mechanism in an embodiment of the present invention.

The following embodiments are described in sufficient detail to enable those skilled in the art to make and use the invention. It is to be understood that other embodiments would be evident based on the present disclosure, and that system, process, or mechanical changes may be made without departing from the scope of the present invention.

In the following description, numerous specific details are given to provide a thorough understanding of the invention. However, it will be apparent that the invention may be practiced without these specific details. In order to avoid obscuring the present invention, some well-known circuits, system configurations, and process steps are not disclosed in detail.

The drawings showing embodiments of the system are semi-diagrammatic and not to scale and, particularly, some of the dimensions are for the clarity of presentation and are shown exaggerated in the drawing FIGS. Similarly, although the views in the drawings for ease of description generally show similar orientations, this depiction in the FIGS. is arbitrary for the most part. Generally, the invention can be operated in any orientation.

The term "module" referred to herein can include software, hardware, or a combination thereof in accordance with the context in which the term is used. For example, the software can be machine code, firmware, embedded code, and application software. Also for example, the hardware can be circuitry, processor, computer, integrated circuit, integrated circuit cores, a pressure sensor, an inertial sensor, a microelectromechanical system (MEMS), passive devices, or a combination thereof.

The term "processing" as used herein includes filtering signals, decoding symbols, assembling data structures, transferring data structures to peripheral storage devices, manipulating data structures, and reading data structures from external sources. Data structures are defined to be files, input data, system generated data, such as calculated data, and program data.

Referring now to FIG. 1, therein is shown a communication system 100 with near maximum-likelihood modulation classifier mechanism in an embodiment of the present invention. The communication system 100 includes a mobile station 102, such as a cellular phone or a notebook computer, connected to a network 104. The network 104 is defined as a system of wires, wired or wireless communications devices, or a combination thereof that are connected to each other for enabling communication between devices.

For example, the network 104 can be a combination wireless cellular phone network having base stations, communication towers and antennae, telephone network, servers, or client devices that are used to enable wireless communication. Also, for example, the network 104 can be a combination of wired or wireless routers, Ethernet cables, computers, or servers for local area networks.

The network 104 can include a base station 106 that is used to receive, transmit, relay, process or combination thereof, for wireless signals. The base station 106 can facilitate the communication with the mobile station 102 by sending, receiving, and relaying communication signals to and from the mobile station 102. The mobile station 102 can be connected to the network 104 through the base station 106.

For example, the base station 106 can be a cell tower, a wireless router, an antenna, or a combination thereof being used to send signals to or receive signals from the mobile station 102, such as a laptop computer or a cellular phone. The base station 106 can relay the signal through the network 104 to enable communication with other user equipment, server, computer, or a combination thereof.

The base station 106 can be used to transmit the communication signals, such as voice signals of a telephone call or a webpage. The base station 106 can also send reference signals or by broadcasting previously determined training signals to the mobile station 102. The mobile station 102 can receive and process signals from the base station 106.

Based on the communication method, such as code division multiple access (CDMA), orthogonal frequency division multiple access (OFDMA), Third Generation Partnership Project (3GPP) Long Term Evolution (LTE), or the fourth generation cellular wireless standards (4G), the communication signals can also have reference signals imbedded in the communicated information. The reference signals can exist as a predetermined bit, pulse, wave, or a combination thereof. The reference signals can be embedded within the communicated information at a regular time interval, frequency, code, or a combination thereof.

The mobile station 102 can communicate with the base station 106 through a channel 108. The channel 108 can be wireless, wired, or a combination thereof. The channel 108 can also include repeaters, amplifiers, or a combination thereof.

For example, the channel 108 can encompass frequency, time slot, packet designation, channel code, or combination thereof used for transmission of signals. Also, for example, the channel 108 can include the behavior of the medium, such as reflection and loss caused by wires or refractions and obstructions in wireless environments.

For illustrative purposes, the base station 106 will be described as transmitting signals and the mobile station 102 as receiving the transmitted signals. However, it is understood that both the mobile station 102 and the base station 106 can each transmit and receive signals.

The communication system 100 can employ a multiple-input and multiple-output (MIMO) scheme for communicating with the various users through multiple antennas. A layer can be defined as a set of information communicated through a particular antenna or a particular set of antennas. Each layer can transmit a group of information to a specific user. The communication system 100 supporting the MIMO scheme can have a transmitted signal 110 that includes various layers including a main layer 112 and an interference layer 114, which can include all sets of information, communicated through the same set of antennas, that are intended for other than the specific user.

The main layer 112 is defined as the layer for transmitting the information to the mobile station 102. The interference layer 114 is defined as all of the layers for transmitting the information to other users. From the perspective of the mobile station 102, the information transmitted to other users through the interference layer 114 can interfere with the information transmitted to the mobile station 102 through the main layer 112.

For illustrative purposes, the transmitted signal 110 will be described as having one each of the main layer 112 and the interference layer 114. However, it is understood that the transmitted signal 110 can have more layers. Further, it is understood that the transmitted signal 110 can have more than one layer dedicated to each particular user, the mobile station 102, or a combination thereof.

The main layer 112 can be transmitted according to a main modulation 116. The main modulation 116 is defined as the system of signal variations caused at the base station 106 in the carrier signal for conveying the information to the mobile station 102. The main modulation 116 can include analog or digital modulation methods, such as amplitude modulation or various keying techniques. For example, the main modulation 116 can include phase-shift keying (PSK) such as quadrature PSK (QPSK), frequency-shift keying (FSK), amplitude-shift keying (ASK), variations such as binary or 64 symbol schemes thereof, or a combination thereof.

The interference layer 114 can be transmitted according to an interference modulation 118. The interference modulation 118 is defined as the modulation scheme for conveying the information to users other than the mobile station 102. The interference modulation 118 can include PSK, FSK, ASK, binary or quadrature variations thereof, or a combination thereof. The interference modulation 118 can be same as or different from the main modulation 116. The interference modulation 118, the main modulation 116, or both can change over time and during a communication session.

For illustrative purposes, the main modulation 116 and the interference modulation 118 will be described as quadrature amplitude modulation scheme (QAM), including variations such as 16 QAM or 64 QAM. However, it is understood that the main modulation 116 can be different, as described above.

The main modulation 116 and the interference modulation 118 can be visually expressed through a constellation map 120. The constellation map 120 can show the methods of encoding or the characteristics of each portion of sent data using magnitude, real and imaginary elements, phase, angle, or a combination thereof.

The constellation map 120 can show a constellation point 122 representing information, such as a set of bits, to be sent through the channel 108 bearing a uniquely identifiable set of characteristics as defined by the constellation map 120. The transmitted signal 110 can include a combination of the constellation points for transmitting the information.

The mobile station 102 can receive a received signal 124. The received signal 124 is defined as the overall signal perceived at the mobile station 102. The received signal 124 can be the transmitted signal 110 after the transmitted signal 110 travels through the channel 108. The transmitted signal 110 can experience distortion 126 such that the received signal 124 is not identical to the transmitted signal 110. The distortion 126 can be caused by channel gain, delay spread, phase shift, the interference layer 114, signal from other sources, or a combination thereof.

For example, the information in the main layer 112 of the transmitted signal 110 can have a frequency response that resembles a semicircle. The distortion 126 can cause the information in the main layer 112 to degrade and lose the semicircle shape. Furthermore, the mobile station 102 will not see the information in the main layer 112 alone, but combined with the information in the interference layer 114, which has also been distorted. Hence, with respect to the information intended for the mobile station 102, the information in the interference layer 114 can also be viewed as a cause for the distortion 126.

The received signal can be characterized as y[k], where:

$$y[k]=H[k]\times [k]+z[k].$$ Eq. (1)

The index k can be a discrete index, ranging from 1 to a maximum of K. The effects of the channel can be described by a complex channel matrix H[k] of size N by M, where N is the number of antennas at the mobile station 102 and M is the number of antennas at the base station. The transmitted signal 110 can be described by x[k], and z[k] can be the noise component, such as the complex Gaussian noise with the noise variance of $\sigma^2 = E[|z_l|^2]$ or that of a flat fading channel, with l signifying the antenna where the data is received.

For illustrative purposes, the number of antennas at the mobile station 102 will be described as being greater than or equal to the number of antennas at the base station 106 used to transmit to the mobile station 102. However, it is understood that the number of antennas at the mobile station 102 can be less than that of the base station 106.

Due to the distortion 126, the received signal 124 can have a data symbol or a set of data symbols in each layer that do not align with the main modulation 116. The received symbol can be separated from a specific instance of the constellation point 122 by a shift distance 128. The shift distance 128 is defined as a Euclidean distance between the received symbol and the constellation point 122 as defined on the constellation map 120.

Figure 2:
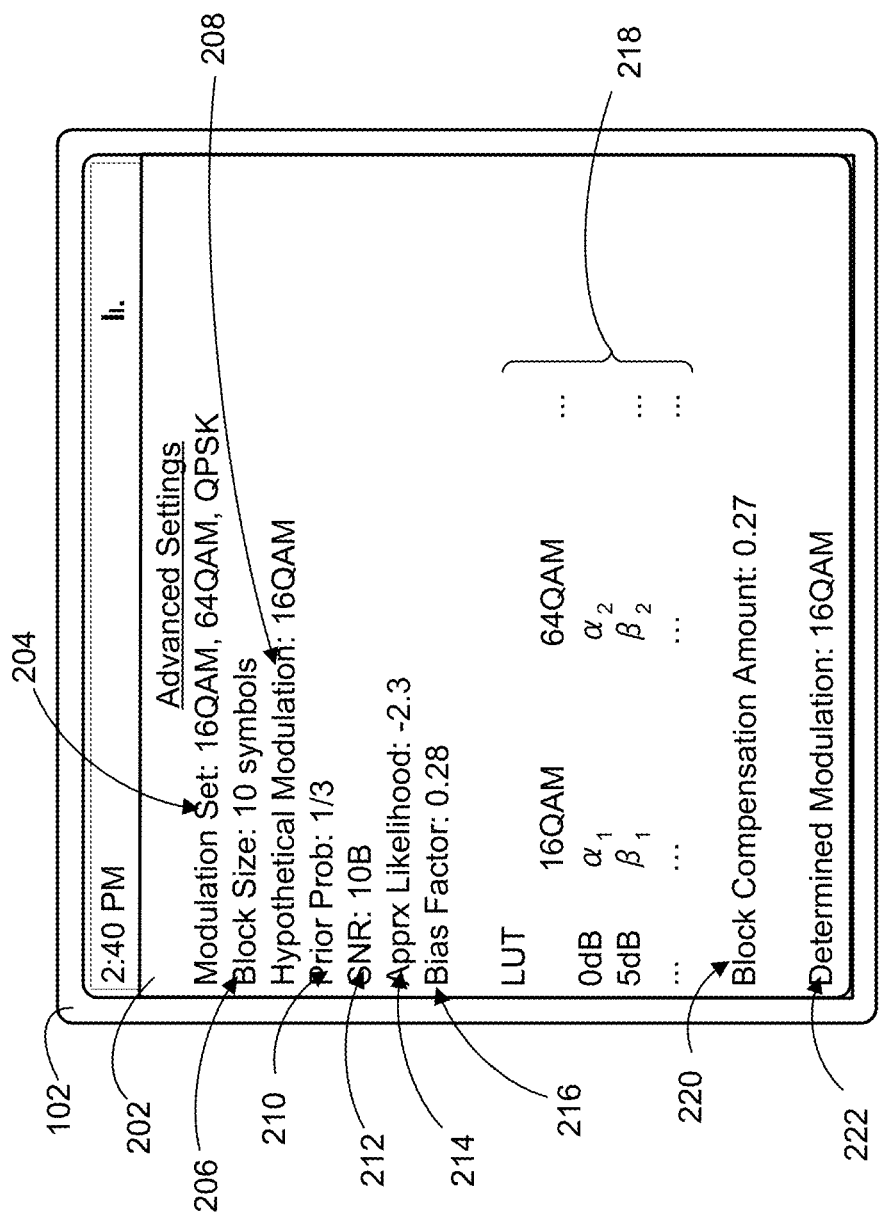
FIG. 2 is an example of a display interface of the mobile station.

Referring now to FIG. 2, therein is shown an example of a display interface 202 of the mobile station 102. The display interface 202 can show a modulation set 204, a block size 206, a hypothetical modulation 208, a prior probability 210, a signal-to-noise ratio 212, an approximate likelihood 214, a bias factor 216, a predetermined bias correspondence 218, a block compensation amount 220, and a determined modulation 222.

The modulation set 204 is defined as a set of modulation schemes that the communication system 100 can use for exchanging data. The modulation set 204 can be the choices for selecting the main modulation 116 of FIG. 1 used to send data from the base station 106 of FIG. 1 to the mobile station 102.

The block size 206 is defined as an amount of information used for subdividing and analyzing the received signal 124 of FIG. 1. The block size 206 can be an amount of symbols, time duration, number of voltage peaks above a reference level, or a combination thereof in the received signal 124. The block size 206 can be determined by counting the symbols, time duration, number of voltage peaks above a reference level, or a combination thereof between synchronizing or reference portions of the received signal 124. The block size 206 can also be determined by counting between handover operations.

The block size 206 can be relative to known aspects of the received signal 124. For example, the block size 206 can be a time duration or a number of symbols before or after a synchronizing pulse, reference signal, header information, or a combination thereof.

The communication system 100 can use the block size 206 to process the received signal 124. The communication system 100 can subdivide the received signal 124 based on the block size 206 or process the received signal 124 based on the block size 206 as the signal is received.

The hypothetical modulation 208 is defined as an estimated modulation scheme used for analyzing the received signal 124. The hypothetical modulation 208 can be used to perform the analysis necessary in selecting or determining a determined modulation 222. The hypothetical modulation 208 can be a name, a number, a character, or a combination thereof that denotes the specific algorithm used during the selection process. The hypothetical modulation 208 can be represented as $C_n$.

The determined modulation 222 is defined as the modulation scheme the mobile station 102 will use to decipher the received signal 124. The determined modulation 222 can be the modulation scheme selected by the mobile station 102 that is most likely identical to the modulation used by the base station 106.

For example, the determined modulation 222 can be the value of the hypothetical modulation 208 that yields the highest probability of matching the main modulation 116 when analyzing the main layer 112 of FIG. 1. The communication system 100 can apply and use the determined modulation 222 in identifying the interference modulation 118 of FIG. 1.

The communication system 100 can use the determined modulation 222 to determine the information in the received signal 124. The communication system 100 can use the determined modulation 222 for the information contained within the block size 206.

The hypothetical modulation 208 can be the modulation used during the selection process leading up to the selection of the determined modulation 222. The value for the determined modulation 222 can be that of the hypothetical modulation 208 when certain conditions are satisfied. The process of selecting the determined modulation 222 will be described below.

The prior probability 210 is defined as a way to express uncertainty about a subject before the data is taken into account in Bayesian statistical model. The prior probability 210 can be used to express the uncertainty regarding the main modulation 116 from perspective of the mobile station 102. The prior probability 210 of each modulation can be denoted by $q_n$ or $Pr\{C_n\}$. The sum of all values for $q_n$ in the modulation set 204 can add up to 1.

The communication system 100 can assume the prior probability 210 for all of the values in the modulation set 204 to be equal for processing the received signal 124. The communication system 100 can ask the prior probability to be 1/N, where N signifies the number of modulations in the modulation set 204. The communication system 100 can also process the received signal 124 using unequal values of the prior probability 210 assigned to each modulation in the modulation set 204.

The signal-to-noise ratio 212 is defined as a measure of the quality of the channel 108 of FIG. 1. The signal-to-noise ratio 212 can be a comparison between the level of the desired signal and the undesired portions of the signal. The signal-to-noise ratio 212 can have the power in the intended information in the main layer 112 as a numerator and the power in the information intended for other users in the interference layer 114 of FIG. 1, the effects of the distortion 126 of FIG. 1, device noise, additive white Gaussian noise (AWGN), or a combination thereof as the denominator.

The communication system 100 can determine that the transmitted signal 110 of FIG. 1 contains symbols that are normalized such that each constellation point is equally probable and that the sum of the absolute value squared of all symbols in the main modulation 116 is the number of symbols in the main modulation 116. With the assumption, the signal-to-noise ratio 212 can be expressed as:

$$SNR = E[|h_k|^2]/\sigma^2. \qquad \text{Eq. (2)}$$

The signal-to-noise ratio 212 can be a function of the value of the channel matrix at index k, shown as $h_k$, and the variance of the noise, shown as $\sigma^2$.

The approximate likelihood 214 is defined as a calculated approximation of a likelihood calculation. The approximate likelihood 214 can be a likelihood or probability that the hypothetical modulation 208 is the main modulation 116. The approximate likelihood 214 can also be the logarithmic derivation of the likelihood or probability.

The approximate likelihood 214 can be used to approximate the process of minimizing the average probability of decision error in likelihood calculations. The approximate likelihood 214 can be used to select the determined modulation 222. Details regarding the calculation and the use of the approximate likelihood 214 will be discussed below.

The bias factor 216 is defined as a calculated offset between the likelihood calculation and the approximate likelihood 214. The bias factor 216 can be related to an instantaneous bias of a signal. The instantaneous bias can be defined as:

$$\beta(y, \sigma) \triangleq \ln\left(1 + \frac{\sum_{s_i \in C_n / \{s_{i_{min}}\}} \exp\left(-\frac{1}{\sigma^2}|y - s_i|^2\right)}{\exp\left(-\frac{1}{\sigma^2}|y - s_{i_{min}}|^2\right)}\right). \qquad \text{Eq. (3)}$$

The instantaneous bias of a signal can be a function the received signal 124, shown as y, the variance of the noise, shown as $\sigma^2$. The instantaneous bias can further include the hypothetical modulation 208 shown as $C_n$, an instance of the constellation point 122 in the hypothetical modulation 208 shown as $s_i$. The instantaneous bias can further be a function of the instance of the constellation point 122 having the minimum Euclidian distance to an estimated symbol within the received signal 124, shown as $s_{i_{min}}$.

The bias factor 216 of the received signal 124 can be related to the transmitted signal 110. The expectation of the bias factor 216 based on the transmitted signal 110 can be defined as:

$$\lim_{K \to \infty} b_n(C_m) = \qquad \text{Eq. (4)}$$

$$E_{Y(C_m)}\left[\ln\left(1 + \frac{\sum_{s_i \in C_n / \{s_{i_{min}}\}} \exp\left(-\frac{1}{\sigma^2}|Y(C_m) - s_i|^2\right)}{\exp\left(-\frac{1}{\sigma^2}|Y(C_m) - s_{i_{min}}|^2\right)}\right)\right] \triangleq B_n(C_m).$$

The bias factor 216 can be based on the instantaneous bias as shown above in equation (3). For the bias factor 216 $Y(C_m)$ can represent the frequency domain representation of the main modulation 116. Other variables in equation (4) can be the same as in equation (3).

The bias factor 216 for the received signal 124 can be estimated by replacing $C_m$ by the hypothetical modulation 208 $C_n$ in the above equation. The block compensation amount 220 is defined as the normalized amounts of the bias factor 216 for a block or group of the symbols in the received signal 124. The block compensation amount 220 can be expressed as:

$$\overline{b}_n \approx \frac{1}{K}\sum_{k=1}^{K} B_n(C_n, \sigma_k). \qquad \text{Eq. (5)}$$

The block compensation amount 220 can be the sum of the bias factor 216 of all symbols or samples within the block size 206, divided by the value of the block size 206. The block compensation amount 220 can be an average value of the bias factor 2016 for all symbols or samples within the block size 206.

When the communication system 100 detects the channel 108 as being flat fading, the communication system 100 can replace the y in equations (3) and (4) with expected value of x. The expected value of x, or □, can be y/h, which is the received signal 124 divided by the distortion 126.

The predetermined bias correspondence 218 is defined as a predetermined set of values of or methods for calculating the bias factor 216 corresponding to various situations. The predetermined bias correspondence 218 can have values of the bias factor 216 corresponding to various values of the signal-to-noise ratio 212 for various possible values of the hypothetical modulation 208.

For example, the predetermined bias correspondence 218 can be a look up table of possible values of the bias factor 216, a set of simplified equations for calculating or estimating the bias factor 216, or a combination thereof. Also, for example, the predetermined bias correspondence 218 can have values or equations corresponding to various predetermined values of the signal-to-noise ratio 212, various modulation schemes, such as QAM or PSK, each of the symbols within each modulation schemes, or a combination thereof.

The communication system 100, the software manufacturer, the hardware manufacturer, or a combination thereof can perform the various calculations for the values of the predetermined bias correspondence 218. The predetermined bias correspondence 218 can be stored in the base station 106, the mobile station 102, or combination thereof. Details regarding the calculation and use of the bias factor 216 and the predetermined bias correspondence 218 will be discussed below.

It has been discovered that the predetermined bias correspondence 218 having values for estimating the bias factor 216 gives rise to faster processing speed and simpler processing, leading to accurate and faster determination of the main modulation 116. The predetermined bias correspondence 218 having values of the bias factor 216 reduces the need to calculate the bias factor 216 for each symbol during runtime, while providing accurate offset information.

It has also been discovered that the combination of the predetermined bias correspondence 218, the bias factor 216, and the approximate likelihood 214 gives rise to accurate and faster implementation of the maximum likelihood determination method while reducing the amount of required hardware. The combination of the predetermined bias correspondence 218, the bias factor 216, and the approximate likelihood 214 can accurately replace the exponential and logarithmic operations, which require large amounts of processing power and hardware.

Figure 3:
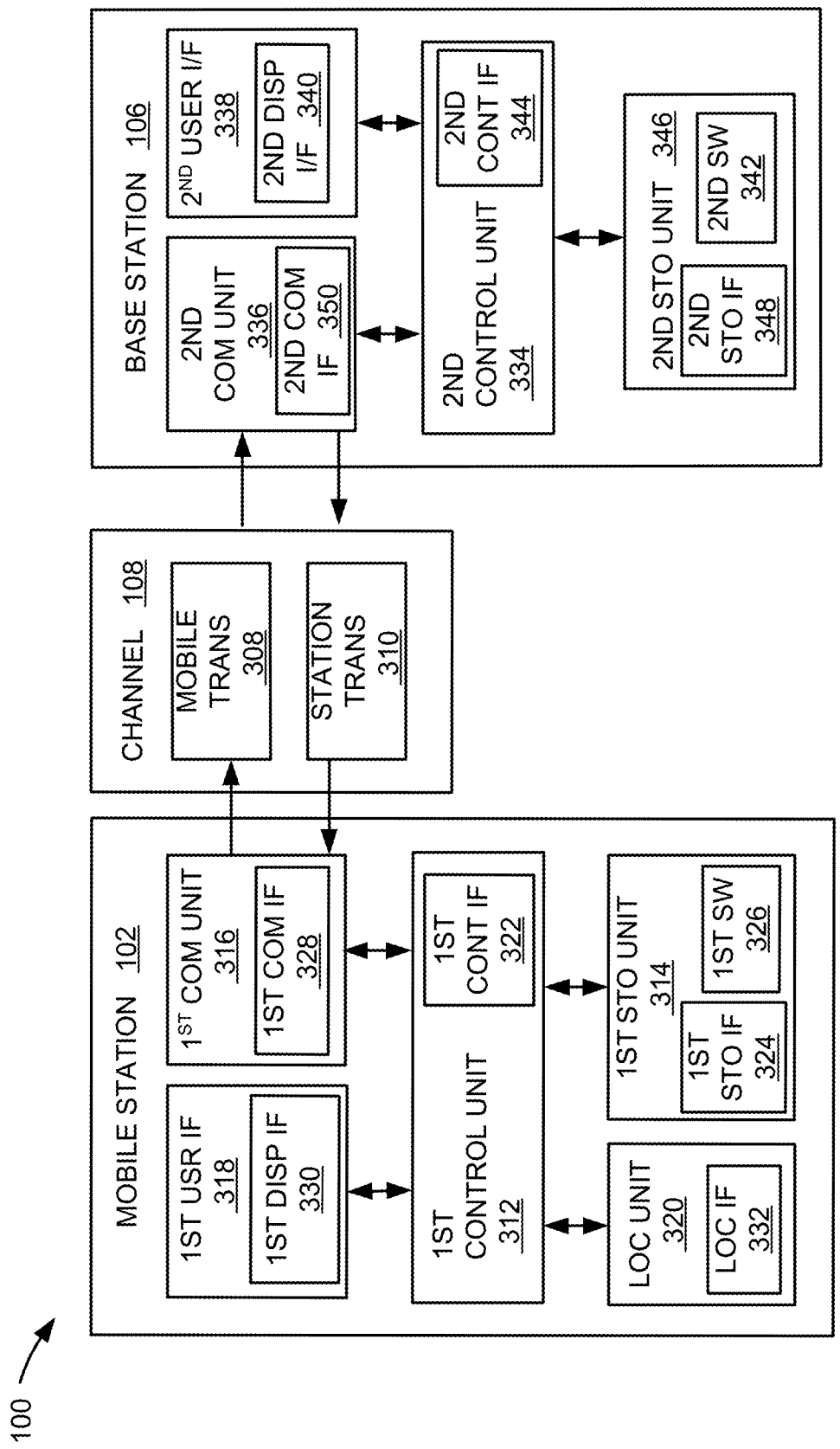
FIG. 3 is an exemplary block diagram of the communication system.

Referring now to FIG. 3, therein is shown an exemplary block diagram of the communication system 100. The communication system 100 can include the mobile station 102, the channel 108, and the base station 106.

The mobile station 102 can communicate with anything within the network 104 of FIG. 1, such as the base station 106 or other users, over the channel 108. The screen shot shown on the display interface 202 described in FIG. 2 can represent the screen shot for the communication system 100.

For illustrative purposes, the communication system 100 will be described as having the mobile station 102 interacting with the base station 106 through the channel 108. It is understood that the mobile station 102 can communicate with other stations in the network 104 of FIG. 1 and with other components in the network 104.

For example, the mobile station 102 can communicate with multiple base stations for handovers. Also, for example, the mobile station 102 can communicate with cellular phones in other areas through the base station 106 and the network 104.

The mobile station 102 can send information in a mobile transmission 308 over the channel 108 to the base station 106. The base station 106 can send information in a station transmission 310 over the channel 108 to the mobile station 102.

For illustrative purposes, the communication system 100 is shown with the mobile station 102 as a client device, although it is understood that the communication system 100 can have the mobile station 102 as a different type of device. For example, the mobile station 102 can be a server.

Also for illustrative purposes, the communication system 100 is shown with the base station 106 as a server and a communications tower and base station, although it is understood that the communication system 100 can have the base station 106 as a different type of device. For example, the base station 106 can be a client device.

For brevity of description in this embodiment of the present invention, the mobile station 102 will be described as a client device and the base station 106 will be described as a communication base station having a communications tower. The present invention is not limited to this selection for the type of devices. The selection is an example of the present invention.

The mobile station 102 can include a first control unit 312, a first storage unit 314, a first communication unit 316, a first user interface 318, and a location unit 320. The mobile station 102 can be similarly described by the mobile station 102. The first control unit 312 can include a first control interface 322. The first storage unit 314 can include a first storage interface 324.

The first control unit 312 can execute a first software 326 to provide the intelligence of the communication system 100. The first control unit 312 can operate the first user interface 318 to display information generated by the communication system 100. The first control unit 312 can also execute the first software 326 for the other functions of the communication system 100, including receiving location information from the location unit 320. The first control unit 312 can further execute the first software 326 for interaction with the channel 108 of FIG. 1 via the first communication unit 316.

The first control unit 312 can be implemented in a number of different manners. For example, the first control unit 312 can be a processor, an embedded processor, a microprocessor, a hardware control logic, a hardware finite state machine, a digital signal processor, or a combination thereof.

The first control unit 312 can include the first control interface 322. The first control interface 322 can be used for communication between the first control unit 312 and other functional units in the mobile station 102. The first control interface 322 can also be used for communication that is external to the mobile station 102.

The first control interface 322 can receive information from the other functional units or from external sources, or can transmit information to the other functional units or to external destinations. The external sources and the external destinations refer to sources and destinations external to the mobile station 102.

The first control interface 322 can be implemented in different ways and can include different implementations depending on which functional units or external units are being interfaced with the first control interface 322. For example, the first control interface 322 can be implemented with a pressure sensor, an inertial sensor, a microelectromechanical system, optical circuitry, waveguides, wireless circuitry, wireline circuitry, or a combination thereof.

The first storage unit 314 can store the first software 326. The first storage unit 314 can also store the relevant information, such as advertisements, points of interest, navigation routing entries, or any combination thereof.

The first storage unit 314 can be a volatile memory, a nonvolatile memory, an internal memory, an external memory, or a combination thereof. For example, the first storage unit 314 can be a nonvolatile storage such as nonvolatile random access memory, Flash memory, disk storage, or a volatile storage such as static random access memory.

The first storage unit 314 can include the first storage interface 324. The first storage interface 324 can be used for communication between the location unit 320 and other functional units in the mobile station 102. The first storage interface 324 can also be used for communication that is external to the mobile station 102.

The first storage interface 324 can receive information from the other functional units or from external sources, or can transmit information to the other functional units or to external destinations. The external sources and the external destinations refer to sources and destinations external to the mobile station 102.

The first storage interface 324 can include different implementations depending on which functional units or external units are being interfaced with the first storage unit 314. The first storage interface 324 can be implemented with technologies and techniques similar to the implementation of the first control interface 322.

The first communication unit 316 can enable external communication to and from the mobile station 102. For example, the first communication unit 316 can permit the mobile station 102 to communicate with the base station 106, an attachment, such as a peripheral device or a computer desktop, and the channel 108.

The first communication unit 316 can also function as a communication hub allowing the mobile station 102 to function as part of the channel 108 and not limited to be an end point or terminal unit to the channel 108. The first communication unit 316 can include active and passive components, such as microelectronics or an antenna, for interaction with the channel 108.

The first communication unit 316 can include a first communication interface 328. The first communication interface 328 can be used for communication between the first communication unit 316 and other functional units in the mobile station 102. The first communication interface 328 can receive information from the other functional units or can transmit information to the other functional units.

The first communication interface 328 can include different implementations depending on which functional units are being interfaced with the first communication unit 316. The first communication interface 328 can be implemented with technologies and techniques similar to the implementation of the first control interface 322.

The first user interface 318 allows a user to interface and interact with the mobile station 102. The first user interface 318 can include an input device and an output device. Examples of the input device of the first user interface 318 can include a keypad, a touchpad, soft-keys, a keyboard, a microphone, or any combination thereof to provide data and communication inputs.

The first user interface 318 can include a first display interface 330. Examples of the output device of the first user interface 318 can include the first display interface 330. The first display interface 330 can include a display, a projector, a video screen, a speaker, or any combination thereof.

The location unit 320 can generate location information, current heading, current acceleration, and current speed of the mobile station 102, as examples. The location unit 320 can be implemented in many ways. For example, the location unit 320 can function as at least a part of GPS, an inertial navigation system, a cellular-tower location system, a pressure location system, or any combination thereof. Also, for example, the location unit 320 can utilize components such as an accelerometer or GPS receiver.

The location unit 320 can include a location interface 332. The location interface 332 can be used for communication between the location unit 320 and other functional units in the mobile station 102. The location interface 332 can also be used for communication that is external to the mobile station 102.

The location interface 332 can receive information from the other functional units or from external sources, or can transmit information to the other functional units or to external destinations. The external sources and the external destinations refer to sources and destinations external to the mobile station 102.

The location interface 332 can include different implementations depending on which functional units or external units are being interfaced with the location unit 320. The location interface 332 can be implemented with technologies and techniques similar to the implementation of the first control unit 312.

For illustrative purposes, the mobile station 102 is shown with the partition having the first control unit 312, the first storage unit 314, the first user interface 318, the first communication unit 316, and the location unit 320 although it is understood that the communication system 100 can have a different partition. For example, the first software 326 can be partitioned differently such that some or all of its function can be in the first control unit 312, the location unit 320, and the first communication unit 316. Also, the mobile station 102 can include other functional units not shown in FIG. 3 for clarity.

The functional units in the mobile station 102 can work individually and independently of the other functional units. The mobile station 102 can work individually and independently from the base station 106 and the channel 108.

The base station 106 can be optimized for implementing the present invention in a multiple device embodiment with the mobile station 102. The base station 106 can provide the additional or higher performance processing power compared to the mobile station 102. The base station 106 can include a second control unit 334, a second communication unit 336, and a second user interface 338.

The second user interface 338 allows a user to interface and interact with the base station 106. The second user interface 338 can include an input device and an output device. Examples of the input device of the second user interface 338 can include a keypad, a touchpad, soft-keys, a keyboard, a microphone, or any combination thereof to provide data and communication inputs. Examples of the output device of the second user interface 338 can include a second display interface 340. The second display interface 340 can include a display, a projector, a video screen, a speaker, or any combination thereof.

The second control unit 334 can execute a second software 342 to provide the intelligence of the base station 106 of the communication system 100. The second software 342 can operate in conjunction with the first software 326. The second control unit 334 can provide additional performance compared to the first control unit 312.

The second control unit 334 can operate the second user interface 338 to display information. The second control unit 334 can also execute the second software 342 for the other functions of the communication system 100, including operating the second communication unit 336 to communicate with the mobile station 102 over the channel 108.

The second control unit 334 can be implemented in a number of different manners. For example, the second control unit 334 can be a processor, an embedded processor, a microprocessor, a hardware control logic, a hardware finite state machine, a digital signal processor, or a combination thereof.

The second control unit 334 can include a second controller interface 344. The second controller interface 344 can be used for communication between the second control unit 334 and other functional units in the base station 106. The second controller interface 344 can also be used for communication that is external to the base station 106.

The second controller interface 344 can receive information from the other functional units or from external sources, or can transmit information to the other functional units or to external destinations. The external sources and the external destinations refer to sources and destinations external to the base station 106.

The second controller interface 344 can be implemented in different ways and can include different implementations depending on which functional units or external units are being interfaced with the second controller interface 344. For example, the second controller interface 344 can be implemented with a pressure sensor, an inertial sensor, a microelectromechanical system, optical circuitry, waveguides, wireless circuitry, wireline circuitry, or a combination thereof.

A second storage unit 346 can store the second software 342. The second storage unit 346 can also store the relevant information, such as phone numbers, identification information, information for multiple access, such as code, frequency, or time slot, advertisements, points of interest, navigation routing entries, or any combination thereof. The second storage unit 346 can be sized to provide the additional storage capacity to supplement the first storage unit 314.

For illustrative purposes, the second storage unit 346 is shown as a single element, although it is understood that the second storage unit 346 can be a distribution of storage elements. Also for illustrative purposes, the communication system 100 is shown with the second storage unit 346 as a single hierarchy storage system, although it is understood that the communication system 100 can have the second storage unit 346 in a different configuration. For example, the second storage unit 346 can be formed with different storage technologies forming a memory hierarchal system including different levels of caching, main memory, rotating media, or off-line storage.

The second storage unit 346 can be a volatile memory, a nonvolatile memory, an internal memory, an external memory, or a combination thereof. For example, the second storage unit 346 can be a nonvolatile storage such as nonvolatile random access memory, Flash memory, disk storage, or a volatile storage such as static random access memory.

The second storage unit 346 can include a second storage interface 348. The second storage interface 348 can be used for communication between the location unit 320 and other functional units in the base station 106. The second storage interface 348 can also be used for communication that is external to the base station 106.

The second storage interface 348 can receive information from the other functional units or from external sources, or can transmit information to the other functional units or to external destinations. The external sources and the external destinations refer to sources and destinations external to the base station 106.

The second storage interface 348 can include different implementations depending on which functional units or external units are being interfaced with the second storage unit 346. The second storage interface 348 can be implemented with technologies and techniques similar to the implementation of the second controller interface 344.

The second communication unit 336 can enable external communication to and from the base station 106. For example, the second communication unit 336 can permit the base station 106 to communicate with the mobile station 102 over the channel 108.

The second communication unit 336 can also function as a communication hub allowing the base station 106 to function as part of the channel 108 and not limited to be an end point or terminal unit to the channel 108. The second communication unit 336 can include active and passive components, such as microelectronics or an antenna, for interaction with the channel 108.

The second communication unit 336 can include a second communication interface 350. The second communication interface 350 can be used for communication between the second communication unit 336 and other functional units in the base station 106. The second communication interface 350 can receive information from the other functional units or can transmit information to the other functional units.

The second communication interface 350 can include different implementations depending on which functional units are being interfaced with the second communication unit 336. The second communication interface 350 can be implemented with technologies and techniques similar to the implementation of the second controller interface 344.

The first communication unit 316 can couple with the channel 108 to send information to the base station 106 in the mobile transmission 308. The base station 106 can receive information in the second communication unit 336 from the mobile transmission 308 of the channel 108.

The second communication unit 336 can couple with the channel 108 to send information to the mobile station 102 in the station transmission 310. The mobile station 102 can receive information in the first communication unit 316 from the station transmission 310 of the channel 108. The communication system 100 can be executed by the first control unit 312, the second control unit 334, or a combination thereof.

For illustrative purposes, the base station 106 is shown with the partition having the second user interface 338, the second storage unit 346, the second control unit 334, and the second communication unit 336, although it is understood that the base station 106 can have a different partition. For example, the second software 342 can be partitioned differently such that some or all of its function can be in the second control unit 334 and the second communication unit 336. Also, the base station 106 can include other functional units not shown in FIG. 3 for clarity.

The functional units in the base station 106 can work individually and independently of the other functional units. The base station 106 can work individually and independently from the mobile station 102 and the channel 108.

For illustrative purposes, the communication system 100 is described by operation of the mobile station 102 and the base station 106. It is understood that the mobile station 102 and the base station 106 can operate any of the modules and functions of the communication system 100. For example, the mobile station 102 is described to operate the location unit 320, although it is understood that the base station 106 can also operate the location unit 320.

Figure 4:
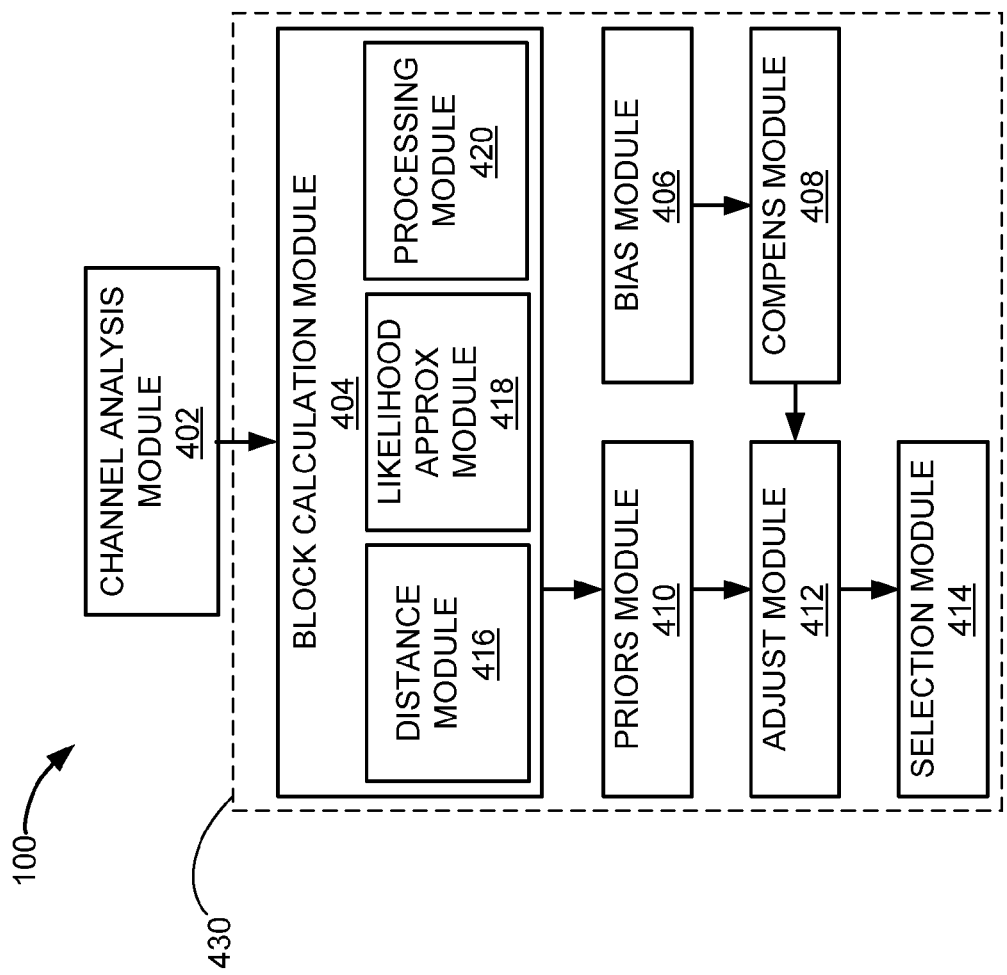
FIG. 4 is a control flow of the communication system for processing a single communication layer.

Referring now to FIG. 4, therein is shown a control flow of the communication system 100 for processing a single communication layer. The communication system 100 can process a single layer communication signal or a single layer within the received signal 124 of FIG. 1. The communication system 100 can have a channel analysis module 402, a block calculation module 404, a bias module 406, a compensation module 408, a priors module 410, an adjustment module 412, and a selection module 414.

The channel analysis module 402 can be coupled to the block calculation module 404. The block calculation module 404 can be coupled to the priors module, which can be coupled to the adjustment module 412. The compensation module 408 can be coupled to the bias module 406, which can be coupled to the adjustment module 412. The adjustment module can be further coupled to the selection module 414.

The channel analysis module 402 is for characterizing the channel 108 of FIG. 1. The channel analysis module 402 can characterize the channel 108 by calculating the distortion 126 of FIG. 1. The channel analysis module 402 can calculate the distortion 126 by analyzing the reference signal portion within the received signal 124. The channel analysis module 402 can calculate the difference, such as amplitude, phase, frequency, signal shape, power, or a combination thereof between a known reference signal and the reference signal portion of the received signal 124.

The channel analysis module 402 can also characterize the channel by calculating the signal-to-noise ratio 212 of FIG. 2. The channel analysis module 402 can calculate the signal-to-noise ratio 212 by first separating the signal portion from the received signal 124. The channel analysis module 402 can then calculate the power within the both the signal portion and the remaining portions of the received signal. The channel analysis module 402 can calculate the signal-to-noise ratio 212 by taking the ratio between the power of the signal portion of the received signal 124 and power of the remaining portion of the received signal 124.

The channel analysis module 402 can use the first communication unit 316, the first control unit 312, or a combination thereof to characterize the channel 108. The channel analysis module 402 can store the results of the characterization in the first storage unit 314.

The block calculation module 404 can have a distance module 416, a likelihood approximation module 418, and a processing module 420. The distance module 416 is for calculating the shift distance 128 of FIG. 1 of the received signal 124 having the distortion 126. The distance module 416 can calculate the shift distance 128 between a symbol or an estimated symbol in the received signal 124 and the constellation point 122 of FIG. 1 in the hypothetical modulation 208 of FIG. 2.

The distance module 416 can calculate the shift distance 128 by selecting a value for the hypothetical modulation 208. The distance module 416 can select the hypothetical modulation 208 from the modulation set 204 of FIG. 2. The distance module 416 can have a predetermined order or method for selecting the hypothetical modulation 208 from the values in the modulation set 204.

The distance module 416 can compare a particular symbol in the received signal 124 to one instance of the constellation point 122 on the hypothetical modulation 208. The distance module 416 can calculate the shift distance 128 between the symbol in the received signal 124 and the instance of the constellation point 122. The distance module 416 can repeat the calculation for all instances of the constellation point 122 on the hypothetical modulation 208. The distance module 416 can repeat the calculations to process all of the symbols in the received signal 124 with the constellation point 122.

The distance module 416 can calculate the shift distance 128 using the distortion 126 of the transmitted signal 110 of FIG. 1. The transmitted signal 110 can include the main layer 112 of FIG. 1 and the interference layer 114 of FIG. 1, with the main layer 112 transmitted using the main modulation 116 of FIG. 1 and the interference layer 114 transmitted using the interference modulation 118 of FIG. 1. The distortion 126 can be seen in the received signal 124 and calculated in the channel analysis module 402.

The distance module 416 can use the first control unit 312 to calculate the shift distance 128 by calculating the difference between the received signal and the constellation point 122. The distance module 416 can use the distance formula or dedicated hardware within the module to calculate the shift distance 128.

The distance module 416 can calculate the shift distance 128 corresponding to the symbol and each of the points in the constellation map 120 of FIG. 1. The distance module 416 can order the points in the constellation based on the shift distance 128. For example, the distance module 416 can order the points on the constellation from the closest point to the symbol to the furthest point. The distance module 416 can store the order of the points and the corresponding values for the shift distance 128 in the first storage unit 314.

The likelihood approximation module 418 is for calculating the approximate likelihood 214 of FIG. 2. The likelihood approximation module 418 can calculate the approximate likelihood 214 for individual symbols or samples as the received signal 124 is received.

The likelihood approximation module 418 can calculate the approximate likelihood 214 using the shift distance 128 for estimating the main modulation 116, the interference modulation 118, or a combination thereof. The likelihood approximation module 418 can calculate the approximate likelihood 214 of the received signal 124 matching the transmitted signal 110 from the shift distance 128. The likelihood approximation module 418 can calculate the approximate likelihood 214 for individual symbols or a set of symbols in the received signal 124.

The likelihood approximation module 418 can calculate the approximate likelihood 214 using the shift distance 128. The likelihood approximation module 418 can calculate a probability or a logarithmic derivation of the probability of the hypothetical modulation 208 matching the main modulation 116 or the interference modulation 118 using the shift distance 128. The likelihood approximation module 418 can calculate the approximate likelihood 214 using a predetermined formula such as:

$$\frac{1}{K}\sum_{k=1}^{K}\left(-\frac{1}{\sigma^2}|y_k - s_{i_{min}}|^2\right) - \ln\pi\sigma^2 M_n \triangleq \hat{l}_{n:}, \quad \text{Eq. (6)}$$

where $s_{i_{min}}$ is the constellation point 122 that is the closest to the symbol in the received signal 124. The $\|\ \|^2$ portion can represent the shift distance 128 or a derivation of the shift distance 128.

The likelihood approximation module 418 can also calculate the approximate likelihood 214 using a distance between the symbol and a different value of the constellation point 122, such as the second or third closest, or a combination thereof.

The likelihood approximation module 418 can use the predetermined formula for AWGN channels. The likelihood approximation module 418 can determine the nature of the channel 108 through a predetermined method using the distortion 126, the signal-to-noise ratio 212, or a combination thereof. Methods for determining the nature of the channel 108 can be predetermined by the communication system 100, the hardware manufacturer, the software manufacturer, the user, or a combination thereof.

The likelihood approximation module 418 can replace the $y_k$ term with $y_k/h_k$ or □ in flat fading channels and use:

$$\frac{1}{K}\sum_{k=1}^{K}\left(-\frac{1}{\sigma^2}|\hat{x}_k - s_{i_{min}}|^2\right) - \ln\pi\overline{\sigma}^2 M_n \triangleq \hat{l}_n. \quad \text{Eq. (7)}$$

The $\|\ \|^2$ portion can represent the shift distance 128 or a derivation thereof between an estimated symbol in the received signal 124 and the constellation point 122 closest to the estimated symbol.

The likelihood approximation module 418 can have the predetermined formulas or methods in the first storage unit 314. The likelihood approximation module 418 can use the first control interface 322 to access the formula, the shift distance 128, the received signal 124, or a combination thereof in the first storage unit 314. The likelihood approximation module 418 can use the first control unit 312 to calculate the approximate likelihood 214.

The likelihood approximation module 418 can perform the function inside of the summation in the above equations (6) and (7) as the received signal 124 is being received. The processing module 420 can determine the when the processing block for the likelihood approximation module 418 should end by determining the block size 206 of FIG. 2.

The processing module 420 can determine the block size 206 by analyzing the patterns of the received signal 124 to process a portion of the received signal 124 likely having the same modulation. The processing module 420 can keep track of the duration or the number of symbols where the received signal 124 follows a predefined voltage magnitude or pattern, phase, frequency, time slot, or a combination thereof. The processing module 420 can assign the value of the duration or the number of symbols for which the received signal is within the predefined range as the block size 206.

The processing module 420 can use a predetermined formula or a predetermined table to calculate the block size 206. For example, the processing module 420 can also calculate the block size 206 by setting a duration or a number of symbols after a handover as the block size 206 using the information gained regarding the channel 108 during the handover process. The formulas and tables can be predetermined by the communication system 100, the software manufacturer, the hardware manufacturer, service provider, the user, or a combination thereof.

The processing module 420 can also have a predetermined value for determining the block size 206. The processing module 420 can use the predetermined value as a constant value for the block size 206 when the change in the transmitted modulation is undetectable, such as when the received signal 124 is too noisy or to serve as an upper limit when the transmitted modulation remains constant.

The processing module 420 can use the first control unit 312 to determine the end of block and the block size 206. The processing module 420 can set a flag, pass the block size 206, pass the control flow, or a combination thereof to the likelihood approximation module 418. The likelihood approximation module 418 can further use the first control unit 312 to calculate the approximate likelihood 214, represented as $\hat{l}_n$, by performing or finishing the summation the factoring using the block size 206 for K, and the subtraction in above equation (6) and (7). The likelihood approximation module 418 can store the approximate likelihood 214 in the first storage unit 314.

The likelihood approximation module 418 can calculate the approximate likelihood 214 as a probability of the hypothetical modulation 208 matching the main modulation 116 or the interference modulation 118. The likelihood approximation module 418 can also calculate the approximate likelihood 214 as a logarithmic derivation of the probability of the hypothetical modulation 208 matching the main modulation 116 or the interference modulation 118. The approximate likelihood 214 can be calculated based on whether the communication system 100 is configured for log-likelihood or likelihood calculations.

The processing module 420 can also initiate the distance module 416 and the likelihood approximation module 418 to reprocess the received signal 124 using a different value for the hypothetical modulation 208. The processing module 420 can accumulate the various calculated values corresponding to each instance of the hypothetical modulation 208. The processing module 420 can repeat the process and perform the calculations and analysis for all possible modulations in the modulation set 204.

The likelihood approximation module 418 can reset the accumulated values and initialize the starting point of the calculation to 1 for the next occurring calculation when the approximate likelihood 214 is configured as a probability. The likelihood approximation module 418 can also reset the accumulated values and initialize the starting point of the calculation to 0 when the approximate likelihood 214 is configured as a logarithmic derivation of the probability.

The bias module 406 is for determining the bias factor 216 of FIG. 2. The bias module 406 can determine the bias factor 216 using an instantaneous bias, the distortion 126, or a combination thereof. The bias module 406 can calculate the bias factor 216 using equation (4) above and the outputs of the channel analysis module 402.

The bias module 406 can use the first storage interface 324 of FIG. 3 to access the outputs of the channel analysis module 402, such as the signal-to-noise ratio 212 or the determined nature of the channel 108, and the method for calculating the bias factor 216. The bias module 406 can use the first control unit 312 and follow equation (4) based on the determined nature of the channel 108 to calculate the bias factor 216.

The bias module 406 can also determine the bias factor 216 from the predetermined bias correspondence 218 of FIG. 2. The bias module 406 can determine the bias factor 216 from the predetermined bias correspondence 218 having values corresponding to possible values of the signal-to-noise ratio 212, the hypothetical modulation 208, or a combination thereof. The bias module 406 can access the predetermined bias correspondence 218 stored in the first storage unit 314 through the first control interface 322, the first storage interface 324, or combination thereof.

The bias module 406 can use the first control unit 312 to identify a value corresponding to the hypothetical modulation 208, the signal-to-noise ratio 212, or a combination thereof. The bias module 406 can use the first control unit 312 to set the value of the bias factor 216 as the corresponding value on the predetermined bias correspondence 218.

It has been discovered that the bias module 406 gives rise to increased processing speed and simpler processing, leading to accurate and faster determination of the main modulation 116 using maximum likelihood methods. The bias module 406 determining the bias factor 216 reduces the need to calculate the bias factor 216, especially through the use of the predetermined bias correspondence 218, for each symbol during runtime, while providing accurate offset information.

It has been also discovered that the combination of the bias module 406 and the likelihood approximation module 418 gives rise to accurate and faster implementation of the maximum likelihood determination method while reducing the amount of required hardware. The combination of the bias module 406 and the likelihood approximation module 418 can accurately approximate the maximum likelihood determination of the main modulation 116 using reduced number of the exponential and logarithmic operations, which require large amounts of processing power and hardware.

The compensation module 408 is for computing the block compensation amount 220 of FIG. 2. The compensation module can calculate the block compensation amount 220 using the bias factor 216 for a portion of the received signal 124 limited by the block size 206. The block compensation amount 220 can be calculated following the equation (5). The compensation module 408 can calculate the block compensation amount 220 using the first control unit 312 and store it in the first storage unit 314.

The priors module 410 is for calculating the prior probability 210 of FIG. 2. The priors module 410 can calculate the prior probability 210 by inverting the number of possible modulations in the modulation set 204. The priors module 410 can also calculate the prior probability 210 according to the Bayesian statistical model.

The priors module 410 can further calculate the prior probability 210 as a log prior when the communication system 100 is configured for logarithmic derivations of probabilities. The priors module 410 can calculate the sum the prior probability 210 and the approximate likelihood 214 for logarithmic derivations. The priors module 410 can calculate the product of the prior probability 210 and the approximate likelihood 214 for non-logarithmic derivations.

The priors module 410 can use the first control unit 312 to calculate the prior probability 210. The priors module 410 can store the prior probability 210 and the sum or product of the prior probability 210 and the approximate likelihood 214 in the first storage unit 314.

The adjustment module 412 is for determining the parameter for the maximum likelihood determination. The adjustment module 412 can determine the parameter by combining the approximate likelihood 214 and the bias factor 216. The adjustment module 412 can combine the product or sum of the prior probability 210 and the approximate likelihood 214 with the block compensation amount.

The adjustment module 412 can determine the parameter for the maximum likelihood determination using the first control unit 312. The adjustment module 412 can store the parameter for the maximum likelihood determination in the first storage unit 314.

The selection module 414 is for selecting the determined modulation 222 of FIG. 2. The selection module 414 can select the determined modulation 222 that maximizes the approximate likelihood 214, the bias factor 216, or a combination thereof. The selection module 414 can select the determined modulation 222 using the approximate likelihood 214 and a corresponding value of the bias factor 216 to approximate the maximum likelihood determination. The selection module 414 can select the determined modulation 222 using the maximum likelihood method as described by:

$$\hat{n} = \arg\max(\hat{l}_n + B_n(C_n)). \quad \text{Eq. (8)}$$

The selection module 414 can use a combination of the approximate likelihood 214 and the bias factor 216, the output of the adjustment module 412, as the input parameter. The selection module 414 can use the first control unit 312 to set the output, or the hypothetical modulation 208 having the lowest values of the shift distance 128 for the received signals, as the determined modulation 222. The selection module 414 can store the determined modulation 222 in the first storage unit 314.

The selection module 414 can adjust the input parameter when the prior probability 210 is not uniform and use the maximum likelihood method as described by:

$$\hat{n} = \arg\max\left(\hat{l}_n + B_n(C_n) + \frac{1}{K}\ln q_n\right). \quad \text{Eq. (9)}$$

The selection module 414 can also use the approximate likelihood 214 from the closest value of the constellation point 122, other values of the constellation point 122, such as the second or fifth closest, or a combination thereof. The selection module 414 select can the hypothetical modulation 208 having the lowest values of the shift distance 128 using comparisons of the received signal 124 to multiple values of the constellation point 122 in the hypothetical modulation 208.

The combination of the block calculation module 404, the bias module 406, the compensation module 408, the priors module 410, the adjustment module 412, and the selection module 414 can be grouped as a single input module 430. The single input module 430 can be used to process single-input single-output (SISO) communications.

The single input module 430 can also be extended to process single-input multiple-output (SIMO) communications using the maximal ratio combining (MRC) method. The communication system 100 can add the output of the single input module 430 for each layer or channel, adjust the gain of each output according to the noise level, and perform ratio-squared combining and pre-detection combining to the symbols to process SIMO communications.

Figure 5:
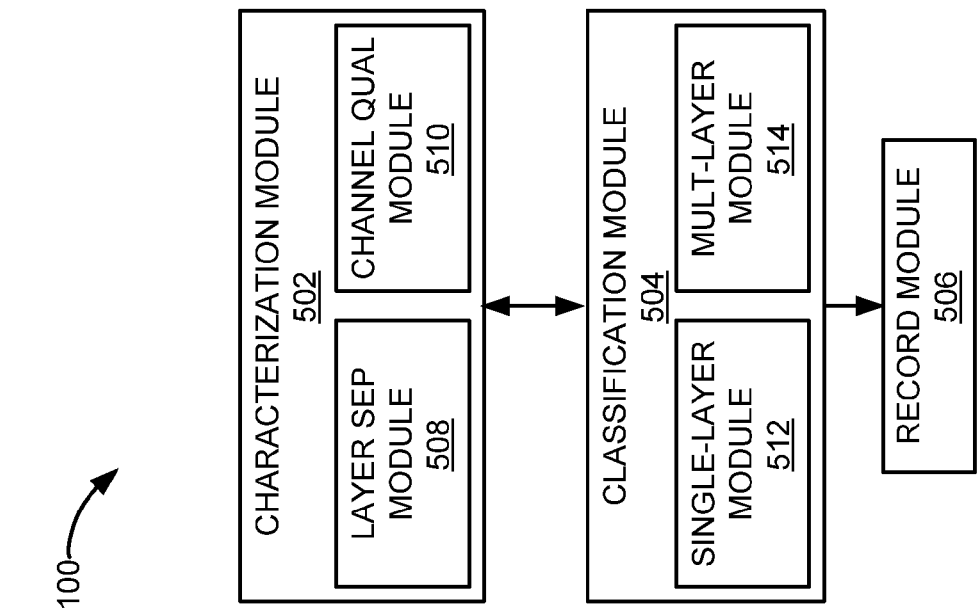
FIG. 5 is a control flow of the communication system for processing a multiple layer communication.

Referring now to FIG. 5, therein is shown a control flow of the communication system 100 for processing a multiple layer communication. The communication system 100 can use the modules shown in FIGS. 3 and 4 to process the received signal 124 of FIG. 1 having more than one layer.

The communication system 100 can have a characterization module 502, a classification module 504, and a record module 506. The characterization module 502 can be coupled to the classification module 504, which can be coupled to the record module 506.

The characterization module 502 is for analyzing the characteristics of the channel 108 of FIG. 1 and the received signal 124. The characterization module 502 can have a layer separation module 508 and a channel quality module 510.

The layer separation module 508 is for separating the layers within the received signal 124. The layer separation module 508 can separate the main layer 112 of FIG. 1 and the interference layer 114 of FIG. 1 from within the received signal 124. The layer separation module 508 can separate all of the layers included in the received signal 124 in MIMO communication systems. The layer separation module 508 can be an implementation of a zero forcing (ZF), a minimum mean square error (MMSE), or an unbiased MMSE receiver.

A linear operation of a receiver can be represented as an M by N matrix G[k]. The estimate of the transmitted signal 110 of FIG. 1 can be expressed as a product of the linear operation of the receiver and the received signal 124. The layer separation module 508 can implement G[k] or simplify G[k] and implement only the last M rows of G[k].

The layer separation module 508 can further use the feedback information from the classification module 504, such as the modulation or probability related to various layers, to estimate the interference modulation 118, the main modulation 116, or a combination thereof. The layer separation module 508 can use information regarding the individual layers for estimating the information transmitted using the interference modulation 118.

The layer separation module 508 can use interference information to estimate the main layer 116. The layer separation module 508 can adjust the information in the main layer 112 using the information transmitted using the interference modulation 118. The layer separation module 508 can identify components of the received signal 124 belonging to the interference modulation 118 and remove it from the received signal 124 to adjust the information in the main layer 112.

The layer separation module 508 can use the first control unit 312 of FIG. 3 to separate the layers within the received signal 124 and identify the main layer 112 and the interference layer 114. The layer separation module 508 can store the results of the separation in the first storage unit 314 of FIG. 3.

The channel quality module 510 is for analyzing the channel characteristics. The channel quality module 510 can be similar or identical to the channel analysis module 402 of FIG. 4. The channel quality module 510 can calculate the distortion 126 of FIG. 1. The channel quality module 510 can calculate the effect of the channel 108 on all of the layers within the received signal 124, including the main layer 112 and the interference layer 114.

The channel quality module 510 can adjust the signal-to-noise ratio 212 of FIG. 2. The channel quality module can adjust the signal-to-noise ratio 212 according to:

$$SNR = E[|[x]_m|^2]/E[\|[GH-I]_m x + [G]_m z\|^2], \quad \text{Eq. (10)}$$

where $[\ ]_m$ denote the separated mth layer (row) of interest.

The classification module 504 is for determining the modulation scheme of all layers within the received signal 124. The classification module 504 can determine an estimate for the main modulation 116 of FIG. 1 and the interference modulation 118 of FIG. 1.

The classification module 504 can have a single-layer determination module 512 and a multiple-layer determination module 514. The single-layer determination module 512 can be similar or identical to the single input module 430 of FIG. 4. The single-layer determination module 512 can determine the estimate for a single layer by selecting the determined modulation 222 of FIG. 2.

The determined modulation 222 selected by the single-layer determination module 512 can be the estimate of the main modulation 116 when processing the main layer 112. The determined modulation 222 can be the estimate of the interference modulation 118 when processing the interference layer 114.

The multiple-layer determination module 514 is for determining the modulation schemes for multiple layers. The multiple-layer determination module 514 can use acceptable methods known in the art. The multiple-layer determination module 514 can operate in combination with the single-layer determination module 512.

For example, the multiple-layer determination module 514 can identify the modulation schemes of the received signal 124 first and the single-layer determination module 512 can identify the remaining schemes after the multiple-layer determination module 514. Also, for example, the multiple-layer determination module 514 can identify the modulation schemes in parallel with the single-layer determination module 512. The single-layer determination module 512 and the multiple-layer determination module 514 can also operate independent of each other.

The classification module 504 can use the first control unit 312 to estimate the modulation schemes. The classification module 504 can store the results of the estimations in the first storage unit 314.

The classification module 504 can set a flag or pass the results of the estimation to the characterization module 502. The layer separation module can separate the main layer 112, the interference layer 114, or a combination thereof from the received signal 124 using the determined modulation 222.

The layer separation module 508 can use the estimated modulation schemes to remove, decode, or both for the applicable layers. The layer separation module 508 can effectively include the mean square decision error in the noise variance through the feedback from the classification module 504 and the removing process.

For example, the layer separation module 508 can use the determined modulation 222 to decode and remove the main layer 112. Also, for example, the layer separation module 508 can use the determined modulation 222 to remove the symbols belonging to the interference layer 114.

The record module 506 is for recording the sequence of the determined modulation 222 and the parameters related to classifying the modulation schemes of all layers. The record module 506 can store the information in the first storage unit 314.

It has been discovered that the combination of the layer separation module 508 and the single-layer determination module 512 provides fast, efficient, and accurate estimates of the modulation schemes. The layer separation module 508 and the single-layer determination module 512 combine to approximate maximum likelihood determination methods using reduced amount of hardware and processing complexity.

The physical transformation of the distortion 126, such as the signal interference experienced by the waves of the communication signal, results in movement in the physical world, such as static noise on the phone call or displaying of erroneous or incomplete information. The movement in the physical world can be fed back to the communication system 100 to further operate the communication system 100. For example, changes in the distortion 126 can trigger a handover and have the mobile station 102 of FIG. 1 connect to a different base station.

Also, the physical transformation of the approximate likelihood 214 of FIG. 2, results in movement in the physical world, such as changing of the main modulation 116, frequency, or both. The movement in the physical world can be fed back to the communication system 100 to further operate the communication system 100.

It is understood that the various modules described above can be implemented as hardware in the first control unit 312 of FIG. 3, the second control unit 334 of FIG. 3, or both. The different modules can also be implemented as separate hardware mechanism, circuit, or device (not illustrated) in the mobile station 102, the base stations, or a combination thereof.

It is further understood that the various modules are for illustrative purposes and can be partitioned differently. For example, the distance module 416 of FIG. 4 or the processing module 420 of FIG. 4 can be combined with the likelihood approximation module 418 of FIG. 4. Also, for example, the block size 206 of FIG. 2 can be calculated by the block calculation module 404 or the likelihood approximation module 418.

Also for illustrative purposes, the mobile station 102 is described as performing most of the above described methods. However, it is understood that the method can be shared with the base station 106 of FIG. 1. For example, the base station 106 can calculate the distortion 126 using the return communication from the mobile station 102 through the second communication unit 336, the second control unit 334, or a combination thereof. The base station 106 can recalculate or adjust the distortion 126 and embed the data into the following transmission.

Also, for example, the base station 106 can have the processing module 420. The base station 106 can calculate the block size 206 by counting the number of symbols. The base station 106 can also send a reset signal when the modulation scheme changes.

Figure 6:
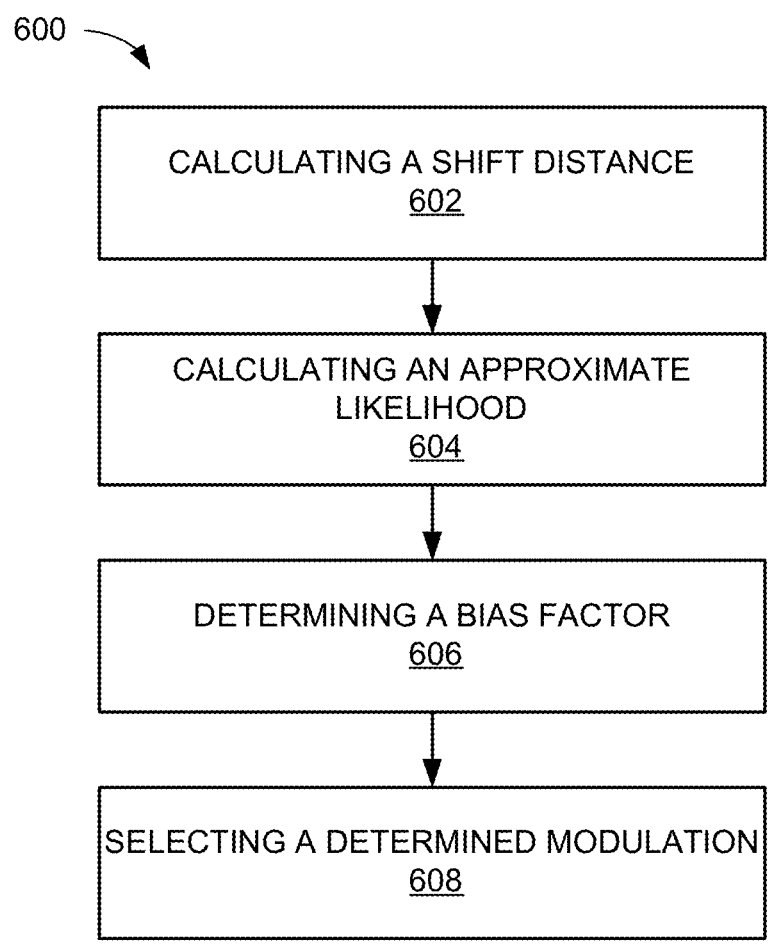
FIG. 6 is a flow chart of a method of operation of a communication system in a further embodiment of the present invention.

Referring now to FIG. 6, therein is shown a flow chart of a method 600 of operation of a communication system in a further embodiment of the present invention. The method 600 includes: calculating a shift distance of a received signal having a distortion in a block 602; calculating an approximate likelihood of the received signal matching a transmitted signal from the shift distance in a block 604; determining a bias factor from the distortion in a block 606; and selecting a determined modulation maximizing a combination of the approximate likelihood and the bias factor for communicating with a device in a block 608.

Yet other important aspects of the embodiments include that it valuably supports and services the historical trend of reducing costs, simplifying systems, and increasing performance.

These and other valuable aspects of the embodiments consequently further the state of the technology to at least the next level.

Thus, it has been discovered that the communication system of the present invention furnishes important and heretofore unknown and unavailable solutions, capabilities, and functional aspects for improving reliability in systems. The resulting processes and configurations are straightforward, cost-effective, uncomplicated, highly versatile, and effective, can be implemented by adapting known technologies, and are thus readily suited for efficiently and economically manufacturing communication system.

Another important aspect of the present invention is that it valuably supports and services the historical trend of reducing costs, simplifying systems, and increasing performance.

These and other valuable aspects of the present invention consequently further the state of the technology to at least the next level.

While the invention has been described in conjunction with a specific best mode, it is to be understood that many alternatives, modifications, and variations will be apparent to those skilled in the art in light of the aforegoing description. Accordingly, it is intended to embrace all such alternatives, modifications, and variations that fall within the scope of the included claims. All matters hithertofore set forth herein or shown in the accompanying drawings are to be interpreted in an illustrative and non-limiting sense.

What is claimed is:

1. A method of operation of a communication system comprising:
   calculating a shift distance of a received signal having a distortion;
   calculating an approximate likelihood of the received signal matching a transmitted signal from the shift distance;
   determining a bias factor from the distortion and a predetermined bias correspondence having values corresponding to possible values of a signal-to-noise ratio, a hypothetical modulation, or a combination thereof; and
   selecting a determined modulation maximizing a combination of the approximate likelihood and the bias factor for communicating with a device.

2. The method as claimed in claim 1 wherein calculating the approximate likelihood includes calculating a probability of a hypothetical modulation matching the main modulation.

3. The method as claimed in claim 1 wherein calculating the approximate likelihood includes calculating a logarithmic derivation of a probability of a hypothetical modulation matching the main modulation.

4. The method as claimed in claim 1 wherein selecting the determined modulation includes selecting the determined modulation from a modulation set having unequal values of a prior probability.

5. A method of operation of a communication system comprising:
   calculating a shift distance of a received signal having a distortion;
   calculating an approximate likelihood of the received signal matching a transmitted signal from the shift distance, with the transmitted signal having a main layer and an interference layer;
   determining a bias factor from the distortion;
   estimating an interference modulation from the approximate likelihood; and
   selecting a determined modulation maximizing a combination of the approximate likelihood and the bias factor using the interference modulation for communicating with a device.

6. The method as claimed in claim 5 further comprising estimating a main layer using an interference modulation.

7. The method as claimed in claim 5 wherein separating the received signal includes implementing an unbiased minimum mean square error process of estimating the transmitted signal.

8. The method as claimed in claim 5 wherein selecting the determined modulation includes approximating a maximum likelihood determination.

9. The method as claimed in claim 5 further comprising calculating a block compensation amount using the bias factor for a portion of the received signal limited by a block size.

10. A communication system comprising:
    a distance module for calculating a shift distance of a received signal having a distortion;
    a likelihood approximation module, coupled to the distance module, for calculating an approximate likelihood of the received signal matching a transmitted signal from the shift distance;
    a bias module, coupled to the likelihood approximation module, for determining a bias factor from the distortion a predetermined bias correspondence having values corresponding to possible values of a signal-to-noise ratio, a hypothetical modulation, or a combination thereof; and
    a selection module, coupled to the bias module, for selecting a determined modulation maximizing a combination of the approximate likelihood and the bias factor for communicating with a device.

11. The system as claimed in claim 10 wherein the likelihood approximation module is for calculating a probability of a hypothetical modulation matching the main modulation.

12. The system as claimed in claim 10 wherein the likelihood approximation module is for calculating a logarithmic derivation of a probability of a hypothetical modulation matching the main modulation.

13. The system as claimed in claim 10 wherein the selection module is for selecting the determined modulation from a modulation set having unequal values of a prior probability.

14. The system as claimed in claim 10 wherein:
    the likelihood approximation module is for calculating the approximate likelihood of the received signal matching the transmitted signal from the shift distance, with the transmitted signal having a main layer and an interference layer;
    the selection module is for selecting a determined modulation maximizing a combination of the approximate likelihood and the bias factor using the interference modulation for communicating with a device; and
   further comprising:
    a layer separation module, coupled to the selection module, for estimating an interference modulation from the approximate likelihood.

15. The system as claimed in claim 14 wherein the layer separation module is for estimating a main layer using an interference modulation.

16. The system as claimed in claim 14 wherein the layer separation module is for implementing an unbiased minimum mean square error process of estimating the transmitted signal.

17. The system as claimed in claim 14 wherein the selection module is for approximating a maximum likelihood determination.

18. The system as claimed in claim 14 further comprising a compensation module, coupled to the bias module, for calculating a block compensation amount using the bias factor for a portion of the received signal limited by a block size.

* * * * *